United States Patent [19]

Merrill

[11] Patent Number: 4,519,720

[45] Date of Patent: May 28, 1985

[54] PROCESS AND ARTICLES FOR REMOVING TYPEWRITER INKS

[75] Inventor: Duane F. Merrill, Ballston Spa, N.Y.

[73] Assignee: General Electric Company, Waterford, N.Y.

[21] Appl. No.: 632,760

[22] Filed: Jul. 20, 1984

Related U.S. Application Data

[62] Division of Ser. No. 418,338, Sep. 15, 1982.

[51] Int. Cl.$^3$ .............................................. B41J 33/00
[52] U.S. Cl. ................................ 400/241; 400/241.1; 428/40; 428/216
[58] Field of Search ................. 400/696, 241.1–241.4, 400/241; 428/481, 216, 421, 214, 40

[56] References Cited

U.S. PATENT DOCUMENTS 4,289,670  9/1981  Creekmore et al. ................. 400/696

*Primary Examiner*—George F. Lesmes
*Assistant Examiner*—E. Rollins Buffalow
*Attorney, Agent, or Firm*—Gary L. Loser

[57] ABSTRACT

An article comprising a backing, a silicone pressure sensitive adhesive, and optionally, a silicone release coating is provided for effecting removal of vertically cohesive inks from cellulosic materials. There is also provided the process of making and using the article.

25 Claims, No Drawings

PROCESS AND ARTICLES FOR REMOVING TYPEWRITER INKS

This application is a division of application Ser. No. 418,338, filed 09/15/82.

BACKGROUND OF THE INVENTION

The present invention relates to processes and articles for effecting removal of ink from paper and the like. More particularly, the present invention relates to a substrate having a silicone pressure sensitive adhesive composition on one side and, optionally, a silicone release coating on the opposite side thereof, so that tapes can be prepared therefrom. Type-correcting tapes made according to the present invention can be unwound without the adhesive blocking to the reverse side of the tape. When the tape is then activated by striking with a typewriter key, the adhesive transfers the ink from the surface of the paper or typing substrate to the type-correcting material.

A vertically cohesive ink is a specially formulated ink which is adapted to have greater internal cohesion than external adhesion to the substrate to which it is applied. Inks having this property generally are deposited as a thin, integral, coherent film on typing paper or other suitable cellulosic substrate. This allows the ink character to be contacted on its surface by an adhesive means and plucked from the surface of the paper as an integral unit, that is, without fracturing internally and without leaving ink remaining on the paper. Correctable typewriter ribbons employing such vertically cohesive inks are commercially available.

The ink-removing or type-correcting article must be made from a discriminating adhesive. A discriminating adhesive is one which has a greater affinity for vertically cohesive ink than for paper or the like. The ability of an adhesive to discriminate between the paper and the ink depends on a variety of factors, including the chemical and physical characteristics of the adhesive. In addition to having a greater affinity for vertically cohesive ink than for the paper, it is also necessary that the adhesive have greater internal cohesion than external adhesion so that all of the ink will be transferred from the surface of the paper or cellulosic substrate to the correction tape. U.S. Pat. Nos. 3,731,781 and 4,085,838 disclose compositions formed from various classes of organic resins or polymers which have acceptable discriminating ability. However, such organic-based correction tapes suffer from poor unwinding when in use as a result of excessive blocking by the adhesive.

Therefore, there is a need for an improved correction tape which employs a discriminating adhesive but which also may be easily unwound without blocking. Accordingly, a ink-removing article wherein one side of a backing or substrate is coated with a silicone pressure sensitive adhesive for removing the ink from the paper, and, optionally, the opposite side thereof has a silicone release coating which insures that a tape made therefrom will unwind during use without the adhesive blocking to the substrate would be very desirable. If a thinner backing material and adhesive layer could be employed than is presently required for organic-based type-correcting tapes, an increased amount of correcting tape could be provided within the limited amount of space available on a typewriter, thus reducing the frequency for changing correction tapes.

Both pressure sensitive adhesives and release coatings are known in the art of silicone chemistry. In general, the technology of pressure sensitive adhesives and tapes is described in Goodwin, Jr., U.S. Pat. No. 2,857,356, Dexter, U.S. Pat. No. 2,736,721, and Currie et al., U.S. Pat. No. 2,814,601, all of which are incorporated herein by reference. Such pressure sensitive adhesives preferably comprise a mixture of a siloxane resin, a siloxane gum and an agent for accelerating the curing of the composition by heating. It is also preferable to employ a solvent as a carrier for the adhesive and to heat the composition to drive off the solvent prior to curing the adhesive to a cohesive pressure sensitive layer. In order to prevent adhesion of the pressure sensitive adhesive to its own backing when it is rolled up into tapes, a suitable anti-blocking or release coating is interspersed between the surface of the pressure sensitive adhesive and the adjacent uncoated surface of the backing for the pressure sensitive adhesive. Examples of such release coatings are described in Leavitt, U.S. Pat. No. 2,985,545 and in deMontery and Zurlo, U.S. Pat. No. 2,985,544, both of which are incorporated herein by reference. The basic concept involved in these silicone release coatings is the cross-linking of a silanol-stopped silicone fluid on the surface of a substrate by the use of a cross-linking agent. Such cross-linking is generally initiated by a catalyst such as, for example, platinum, which causes copolymerization of the polysiloxane composition.

Those skilled in the art appreciate that the siloxane gum is the continuous phase of the pressure sensitive adhesive in which phenyl units can be substituted for methyl units to change the properties of the adhesive, as for example, its aggressiveness. A siloxane resin, typically a resin which is comprised of monofunctional and tetra or quadrifunctional units (known in the art as an MQ resin), is reacted with such siloxane gum in formulating both methyl-based and phenyl-modified pressure sensitive adhesives. The properties of pressure sensitive adhesive also depend upon the resin to gum ratio. For example, high resin content adhesives are relatively tack-free at room temperature and become increasingly tacky with the application of heat and pressure whereas high gum content adhesives are extremely tacky and aggressively adhesive at room temperature. Because silicone pressure sensitive adhesives are known for being very aggressive, it would not be expected that a silicone pressure sensitive adhesive could be formulated which has greater internal cohesion than external adhesion to the material to which it is attached and which exhibits the discrimination necessary for effecting removal of vertically cohesive inks from paper and the like.

The prior art discloses that the presence of phenyl groups in the polysiloxane gum imparts to the presssure sensitive adhesive a marked increase in adhesion and tackiness above that realized by employing a polysiloxane gum containing only silicon-bonded methyl groups in the preparation of the adhesive. Inasmuch as the art of pressure sensitive adhesives is generally concerned with improving the aggressivness of such adhesives to any surface rather than to providing compositions which are selectively aggressive, the prior art nowhere discloses the novel ink-removing article and process of the present invention. For example, O'Malley, U.S. Pat. No. 4,039,707, discloses a pressure sensitive adhesive wherein it is essential that the number of silicon-bonded phenyl groups be maintained such that for each 2 to 75 phenyl groups attached directly to silicon by carbon-silicon linkage, there is also present from 98 to 25 silicon-bonded methyl groups. Hahn et al., U.S. Pat. No. 3,983,298, discloses a pressure sensitive adhesive which is not phenyl modified; however, it is disclosed therein that in order to obtain a suitable pressure sensitive adhesive composition the resin must be present in from 50 to 60 parts by weight and the polydiorganosiloxane gum must be present within the range of from 40 to 50 parts by weight, the total parts of resin and gum being 100 parts.

It is also known in the art that phenyl adhesives are not compatible with methyl adhesives and other methyl polymers. Thus, when phenyl adhesives are applied and cured over a cured film of methyl-based silicone paper release coating, the high-phenyl adhesive can be transferred to other surfaces. However, when methyl-based adhesives are applied and cured over a cured film of methyl-based silicone paper release coating, the methyl adhesive would not be expected to be easily transferred to other surfaces without blocking or transferring the adhesive to the tape backing. Thus, it is surprising to find that certain methyl-based adhesives having a resin to gum ratio within a critical range are easily and effectively released from a methyl-based silicone paper release coating.

Accordingly, it is an object of the present invention to provide a type-correcting article comprising a silicone pressure sensitive adhesive applied to a backing material wherein the pressure sensitive adhesive has a greater affinity for a vertically cohesive ink and its own backing material than it does for a cellulosic substrate such as paper or the like.

It is also an object of the present invention to provide an adhesive which has greater internal cohesion than external adhesion so that the article of the present invention will effectively remove substantially all of a vertically cohesive ink from the paper or cellulosic surface to the backing material having the pressure sensitive adhesive thereon.

It is still a further object of the present invention to provide such a type-correcting article in the form of a tape wherein a methyl-based silicone pressure sensitive adhesive is applied to one side of the tape or backing material and wherein a methyl-based silicone release coating is applied to the other side thereof such that the tape or backing material can be unwound without blocking or offsetting of the adhesive to the adjacent backing of the tape.

Other objects and advantages of the present invention will be obvious from the following detailed description.

SUMMARY OF THE INVENTION

The present invention provides an article for removing vertically cohesive ink from a substrate comprising:
(a) a backing material and
(b) a silicone pressure sensitive adhesive composition cured to a side of said backing material, said pressure sensitive adhesive composition comprising the co-condensation reaction product of a mixture containing 100 parts by weight of a trimethyl chain-stopped MQ resin having an M to Q ratio ranging from approximately 0.5 to 1.0:1 and 44 to 57 parts by weight of a dimethylpolysiloxane gum having a penetration ranging from approximately 500 to 1,200 millimeters at 25° C.

The present invention also provides a method for removing vertically cohesive ink from a substrate comprising the steps:
(a) contacting a pressure sensitive adhesive side of an ink removing article comprising a silicone pressure sensitive adhesive composition applied to a backing material and cured thereon against a vertically cohesive ink disposed on a substrate, said pressure sensitive adhesive composition being the co-condensation reaction product of a mixture containing 100 parts by weight of a trimethyl chain-stopped MQ resin having an M to Q ratio ranging from 0.5 to 1.0:1 and 44 to 57 parts by weight of a dimethylpolysiloxane gum having a penetration ranging from 500 to 1,200 millimeters at 25° C.; and
(b) curing said silicone pressure sensitive adhesive composition to said backing material in the presence of a catalyst.

Still further, the instant invention provides a method for making an ink removing article comprising the steps:
(a) applying to a backing material a silicon pressure sensitive adhesive composition which is the co-condensation reaction product of a mixture containing 100 parts by weight of a trimethyl chain-stopped MQ resin having an M to Q ratio ranging from 0.5 to 1.0:1 and 44 to 57 parts by weight of a dimethylpolysiloxane gum having a penetration ranging from 500 to 1,200 millimeters at 25° C.; and
(b) curing said silicone pressure sensitive adhesive compositions to said backing material in the presence of a catalyst.

DESCRIPTION OF THE INVENTION

In accordance with the present invention there is provide a silicone pressure sensitive adhesive composition comprising the co-condensation reaction product of (1) 100 parts by weight of a resinous copolymer of $R_3SiO_{0.5}$ units (M units) and $SiO_2$ units (Q units) wherein the ratio of $R_3SiO_{0.5}$ units per $SiO_2$ unit varies from 0.5 to 1.0:1 and (2) 44 to 57 parts by weight of a silanol endstopped diorganopolysiloxane gum having the general formula

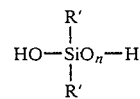

n being sufficiently large to provide a gum having a penetration of from 500 to 1,200 millimeters at 25° C.

The resinous copolymers of $R_3SiO_{0.5}$ units and $SiO_2$ units employed in the practice of the present invention are well known in the prior art and are described, for example, in Dexter, U.S. Pat. No. 2,736,721, Goodwin, Jr., U.S. Pat. No. 2,857,356, and Daudt et al., U.S. Pat. No. 2,676,182, which is also incorporated herein by reference. However, a number of such methods are applicable and the present invention is not dependent upon the particular method by which the resinous copolymer is made. Accordingly, the resinous copolymer can be made by the process of the Goodwin, Jr. patent which involves the cohydrolysis of a trialkyl hydrolyzable silane and an alkyl silicate; that is, by adding the trialkyl hydrolyzable silane and alkyl silicate to a suitable solvent and thereafter adding a sufficient amount of water to effect the desired hydrolysis and co-condensation. Of course, the proportions of trialkyl hydrolyzable silane and alkyl silicate must result in a resinous copolymer containing from 0.5 to 1.0 $R_3SiO_{0.5}$ units per $SiO_2$ unit. According to the method of the Goodwin, Jr., patent, the two components are dissolved in a suitable solvent and added with stirring to water at a temperature on the order of 60° to 85° C. Additionally, there may be included plasticizers, extending filler and process aids. Thereafter, the resulting two-phase system is processed to remove the resulting water-alcohol layer and the resinous material is neutralized with a sufficient amount of sodium bicarbonate or other alkaline material. The resinous solution is then filtered and the resinous solids content adjusted to the desired level, typically 30 to 65%.

Regardless of the method by which the resinous copolymer is formed, it is critical that all of the R groups be methyl in order to provide a pressure sensitive adhesive having greater internal cohesion than external adhesion and in order to obtain a pressure sensitive adhesive having the necesssary ability to discriminate between the cellulosic substrate and the cohesive ink disposed thereon. Thus, for example, all of the alkyl groups of the trialkyl hydrolyzable silane must be methyl groups.

The diorganopolysiloxane gums employed in the present invention are readily prepared by any of the known methods for preparing siloxane high polymers such as acid or alkali catalyzed polymerization of the corresponding cyclic siloxanes. Accordingly, the diorganopolysiloxane gum can also be made by the process of the Goodwin, Jr. patent which involves heating cyclic organopolysiloxanes at a temperature of 125° C. to 150° C. in the presence of a small amount of rearrangement catalyst such as potassium hydroxide. In general, the polymerization is carried out for a time sufficient to obtain a high molecular weight product, preferably having a viscosity within the range of 75,000 centipoise to 125,000 centipoise at 25° C. After the polymerized product is obtained, the product is treated to provide terminal silicon-bonded hydroxy groups on the molecules of the diorganopolysiloxane gum for co-reaction with the MQ resin. This can be accomplished by blowing steam through or across the surface of the polymer. However, this decreases the viscosity of the polymer while at the same time increasing the silanol content of the diorganopolysiloxane. Although it could be used in this form, it is preferable to reheat the diorganopolysiloxane, which still contains the rearrangement catalyst, to a temperature within the range of 125° C. to 250° C. Such reheating provides a higher viscosity material, for example, on the order of 200,000 centipoise to 3,000,000 centipoise. Once the desired viscosity has been attained, the product should be treated in order to inactivate the siloxane rearrangement catalyst.

As in the case of the resinous copolymer, it is also critical that all of the R' group of the polysiloxane gum be methyl groups. Here methyl groups are necessary in order to provide a pressure sensitive adhesive which is substantially dry or tack-free at room temperature and which becomes activated or tacky when subjected to heat or pressure.

In addition to the requirement that all of the R and R' groups of the resin and gum, respectively, be methyl groups, it is also critical that the ratio of resin to gum be within the range of 1.75 to 2.25:1 in order to obtain a pressure sensitive adhesive having the desired properties. Generally the ratio of resin to gum affects properties such as tack, peel, adhesion and dryness. However, heretofore known pressure sensitive adhesives did not include such high resin to gum ratios as it was thought the adhesive would not be sufficiently aggressive.

The actual preparation of the silicon pressure sensitive adhesive from the MQ resin and diorganopolysiloxane gum is relatively simple in that it merely requires mixing the two components together and then heating the mixture to effect co-condensation. In general this co-condensation is effected by heating the reaction mixture at a temperature of from 80° C. to 150° C. More particularly, since the resinous copolymer is present as a 30 to 65 percent solid solution, it is desirable to use this as the basis from which to synthesize the pressure sensitive adhesive. This generally involves the addition of more solvent and the silicone gum. The entire mixture is then heated at the reflux temperature of the reaction mixture for several hours to insure that co-condensation has been effected. After this heating step, the reaction mixture is stripped of sufficient solvent to increase the solids content to about 40 to 75 weight percent solids. The amount of solvent in the mixture can vary widely as its only function is to facilitate the handling of the pressure sensitive adhesive.

The ink-removing or type-correcting article of the present invention is provided by applying a 0.3 to 0.8 mil coating of such pressure sensitive adhesive to a suitable backing material or substrate. Preferably the backing material is a polyester film such as polyethylene terephthalate, sold by DuPont Co. under the trademark Mylar, and more preferably such polyester film is about 1 mil in thickness. However, any relatively flexible material is suitable as a backing material or substrate to which the above-described pressure sensitive adhesive composition is cured. Other preferred backing materials include paper, cloth, polyethylene, polytetrafluoroethylene and polyester film of other thickness. It is more preferable that the coating of pressure sensitive adhesive be 0.4 to 0.6 mil in thickness, and most preferably approximately 0.5 mil in thickness. Following application of the formulation to the substrate by conventional means such as spraying, reverse roll, knife, overroll or brushing, the formulation is cured at elevated temperature, in the presence of a catalyst or curing agent. Preferably such curing agent is a peroxide catalyst such as benzoyl peroxide or dichlorobenzoylperoxide at a level of 1 to 2% based on the silicone content of the pressure sensitive adhesive; however, any organic perioxide present in amounts ranging from about 0.01 to 3.0% by weight based on the silicone content of the pressure sensitive adhesive is effective. In application, the catalyst is mixed into the 40 to 75 percent solids solution of the pressure sensitive adhesive. The solution is then coated on the desired backing or substrate, and the backing is heated at a temperature of from about 80° C. to 175° C. to evaporate the solvent and to cure the pressure sensitive adhesive composition. More preferably, the article of the present invention is cured for 2 minutes at 90° C. and thereafter for 2 minutes at 165° C. The article thus formed is substantially tack-free or dry at room temperature and becomes activated or tacky upon application of pressure or heat.

This embodiment is useful for removing printing ink from larger surfaces, such as, for example, labels. Although the preferred use is correction tape for typewriters, it may be used in any application where pressure can be applied to backing material for ink removal. In use, the instant embodiment effects transfer of a vertically cohesive ink from the cellulosic substrate to the backing material by causing the pressure sensitive adhesive side of the backing to come into contact with the vertically cohesive ink and cellulosic material and applying pressure thereto. Because both the ink and the pressure sensitive adhesive have greater internal cohesion than external adhesion, and because the pressure sensitive adhesive is capable of discriminating between the ink and cellulosic substrate, transfer of the ink from the substrate to the backing as an integral unit is effected, that is, without fracturing internally and without leaving ink remaining on the cellulosic substrate.

In the preferred embodiment it is anticipated that the ink-removing article will be rolled into tapes for use on self-correcting typewriters. Although the pressure sensitive adhesive is substantially dry and tack-free at room temperature, so that the pressure sensitive adhesive does not adhere to its own backing, a suitable anti-blocking or release coating is interspersed between the surface of the pressure sensitive adhesive and the adjacent backing for the pressure sensitive adhesive. In this respect, the materials employed to form such a release coating must exhibit less adhesion to the silicone pressure sensitive adhesive than does the backing to which the pressure sensitive adhesive is cured.

Examples of silicone release coatings are disclosed in Grenoble, U.S. Pat. No. 3,900,617 and Eckberg, U.S. Pat. No. 4,256,870, both of which are assigned to the same assignee as the present invention, and are incorporated in the present case by reference. The release coating of the Grenoble patent generally comprises (i) a vinyl chain-stopped polyorganosiloxane, (ii) an organic hydrogenpolysiloxane, and (iii) a platinum catalyst effective to cause copolymerization of (i) and (ii). Eckberg's silicone release coating is basically a combination of (a) a diorganopolysiloxane base polymer having up to approximately 20% by weight alkenyl or silanol functional groups and having a viscosity ranging from approximately 50 to 100,000 centipoise at 25° C.; (b) a polymethylhydrogen siloxane fluid cross-linking agent having up to approximately 100% by weight SiH groups and having a viscosity in the range of approximately 25 to approximately 1,000 centipoise at 25° C.; (c) an effective amount of precious metal catalyst for facilitating an addition cure hydrosilation reaction between the base polymer and the cross-linking agent, and (d) an amount of dialkyl carboxylic ester effective to inhibit the precious metal catalyzed hydrosilation cure reaction at temperatures below the heat cure temperature.

It is well known in the art, and described more fully in O'Malley, U.S. Pat. No. 4,039,707, which is assigned to the same assignee as the present invention and also incorporated herein by reference, that it is essential that the organpolysiloxane gum of the pressure sensitive adhesive contain aryl groups such as phenyl in order to obtain optimum pressure sensitive adhesive properties. Moreover, it is well known that such phenyl constituents are essential for eliminating blocking during unwinding of the tape. This is because methyl-based adhesives and methyl-based release coatings are compatible whereas phenyl-modified adhesives and methyl-based release coatings are incompatible, and therefore easily released from one another. Accordingly it was unexpected that the methyl-based pressure sensitive adhesive composition described hereinabove is incompatible with, that is, releaseable from, the MQ resin modified release coating disclosed in Applicant's copending application, Ser. No. 132,929, filed Mar. 24, 1980, which is incorporated by reference in the present disclosure.

Briefly, in Applicant's copending patent application there is disclosed a release coating comprising: (i) 100 parts by weight of a silicone composition comprising (a) 100 parts by weight of a vinyl chain-stopped diorganopolysiloxane base polymer having the formula

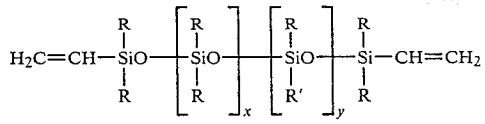

wherein R is a monovalent hydrocarbon radical, preferably methyl, free of unsaturation, R' is a hydrocarbon radical having alkenyl, preferably vinyl, unsaturation, x and y are sufficiently large such that the viscosity ranges from approximately 50 to 100,000 centipoise at 25° C. and such that there is from 0 to 20% by weight R' groups, (b) approximately 0.1 to 10 parts by weight of a trimethyl chain-stopped polymethylhydrogen siloxane fluid cross-linking agent having from approximately 10% to 100% by weight SiH groups and having a viscosity in the range of 25 to 1,000 centipoise at 25° C.; (c) an effective amount of precious metal catalyst for facilitating a heat cure hydrosilation reaction, ordinarily 10 to 500 ppm platinum in the form of a platinum complex catalyst and (ii) approximately 2.0 to 10 parts by weight of an MQ resin having an M to Q ratio of 0.5 to 1.0 wherein M represents $R_3SiO_{0.5}$ units and Q represents $SiO_2$ units and R denotes a monovalent hydrocarbon radical, preferably methyl.

To 100 parts of this release coating there is optionally added 0 to 10 parts of an adhesion promoter such as, for example, methyltriacetoxysilane and 300 to 400 parts of a suitable solvent such as hexane. It should be noted, however, that this is not usually necessary as 100% solids addition cure release coatings are readily available. A uniform coating of such mixture is applied to the reverse side of the backing material for the pressure sensitive adhesive and cured at an elevated temperature, typically within the range of 325° F. to 375° F., and preferably at a temperature of approximately 350° F. for approximately 30 seconds.

The backing material, coated on one side with a pressure sensitive adhesive and on the other side with a release coating, can then be rolled up into a tape without the adhesive offsetting or blocking to the adjacent backing material. This tape can then be used on any self-correcting typewriter, the pressure sensitive adhesive being activated by being struck with a typewriter key on the side of the tape having the release coating thereon. Generally the typewriter key so struck corresponds to the typed ink character which is to be removed from the paper, thereby activating a portion of the correcting tape which corresponds to such ink character.

Thus, there is provided an article in the form of a tape having a methyl-based pressure sensitive adhesive composition on one side and a methyl-based release coating on the opposite side thereof which is useful as a type-correcting tape for self-correcting typewriters.

In order that those skilled in the art might be better able to practice the present invention, the following example is given by way of illustration and not by way of limitation.

EXAMPLE

To one side of a one mil Mylar polyester film backing there was applied a release coating comprising a mixture containing 95 parts of vinyl chain-stopped diorganopolysiloxane base polymer, 5 parts MQ resin, 10 parts of trimethyl stopped linear methylhydrogenopolysiloxane, 5 parts methyltriacetoxy silane, and approximately 25 ppm platinum catalyst dispersed in 400 parts hexane. This coating was cured for 30 seconds at 350° F. to provide a cured release coating composition.

To the opposite side of the Mylar backing there was applied a 0.5 mil coating of pressure sensitive adhesive which was the co-condensation reaction product of 100 parts MQ resin having an M to Q ratio of approximately 0.65 and 46 parts dimethylpolysiloxane gum having a penetration of approximately 800 millimeters at 25° C. The coated Mylar backing was then catalyzed with 1% benzoyl peroxide and cured for 2 minutes at 90° C. and 2 minutes at 165° C.

The backing was rolled into a tape having a substantially dry, tack-free pressure sensitive adhesive, which unwound without blocking and which gave clear correction of typed images.

I claim:

1. A method for removing vertically cohesive ink from a substrate comprising the steps of:
   (a) contacting a pressure sensitive adhesive side of an ink removing article comprising a silicone pressure sensitive adhesive composition applied to a backing material and cured thereon against a vertically cohesive ink disposed on a substrate, said pressure sensitive adhesive composition being the co-condensation reaction product of a mixture containing 100 parts by weight of a trimethyl chain-stopped MQ resin having an M to Q ratio ranging from 0.5 to 1.0:1 and 44 to 57 parts by weight of a dimethylpolysiloxane gum having a penetration ranging from 500 to 1,200 millimeters at 25° C.; and
   (b) applying pressure to said backing material to effect transfer of the vertically cohesive ink from said substrate to said ink-removing article and wherein the adhesive has a greater affinity for the vertically cohesive ink than for the substrate and has a greater internal cohesion than external adhesion.

2. The method of claim 1 wherein said backing material is flexible.

3. The method of claim 1 wherein said backing material is selected from the group consisting of polyethylene terephthalate, paper, cloth, polyethylene and polytetrafluoroethylene.

4. The method of claim 1 wherein said backing material is a film of polyethylene terephthalate approximately 1 mil in thickness.

5. The method of claim 1 wherein said pressure sensitive adhesive composition is cured to said backing material in a layer of from 0.3 mil to 0.8 mil in thickness.

6. The method of claim 1 wherein said pressure sensitive adhesive composition is cured to said backing material in a layer of from 0.4 mil to 0.6 mil in thickness.

7. The method of claim 1 wherein said pressure sensitive adhesive composition is cured to said backing material in a layer approximately 0.5 mil in thickness.

8. The method of claim 1 wherein said substrate having a vertically cohesive ink disposed thereon is a cellulosic material.

9. The method of claim 1 wherein said backing material is rolled into a tape, further comprising a release coating cured on the side of said backing material opposite said pressure sensitive adhesive composition, said release coating comprising:
   (a) 100 parts by weight of a silicone composition comprising:
      (i) 100 parts by weight of a vinyl chain-stopped diorganopolysiloxane base polymer having the formula

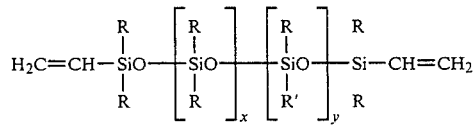

wherein R is a monovalent hydrocarbon radical free of unsaturation, R' is a hydrocarbon radical having alkenyl unsaturation, x and y are sufficiently large such that there is from 0 to 20 percent by weight R' groups;
      (ii) approximately 0.1 to 10 parts by weight of a trimethyl chain-stopped polymethylhydrogen siloxane fluid cross-linking agent having from approximately 10% to 100% by weight of SiH groups and having a viscosity in the range of 25 to 1,000 centipoise at 25° C.; and
      (iii) an effective amount of platinum catalyst for facilitating a heat cure hydrosilation reaction;
   (b) approximately 2.0 to 10 parts by weight of an MQ resin having an M to Q ratio of from 0.5 to 1.0:1, wherein M represents $R_3SiO_{0.5}$ units and Q represents $SiO_2$ units and wherein R is a monovalent hydrocarbon radical; and
   (c) 0 to 10 parts by weight of an adhesion promoter.

10. A method for removing vertically cohesive ink from a cellulosic substrate comprising the steps:
    (a) contacting a pressure sensitive adhesive side of a type-correcting tape comprising:
       (i) a silicone pressure sensitive adhesive composition applied to one side of a polyethylene terephthalate film of approximately 1 mil in thickness and cured thereon in a layer of approximately 0.5 mil in thickness, said pressure sensitive adhesive composition being the co-condensation reaction product of a mixture containing 100 parts by weight of a trimethyl chain-stopped MQ resin having an M to Q ratio ranging from approximately 0.5 to 1.0:1 and 44 to 57 parts by weight of a dimethylpolysiloxane gum having a penetration ranging from approximately 500 to 1,200 millimeters at 25° C.; and
       (ii) a release coating applied to the opposite side of said polyethylene terephthalate film and cured thereon said release coating comprising (a) 100 parts by weight of a silicone composition comprising (i) 100 parts by weight of a vinyl chain-stopped diorganopolysiloxane base having the formula

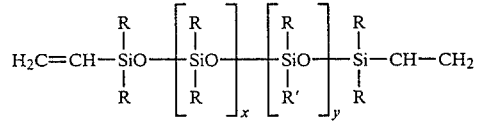

wherein R is a monovalent hydrocarbon radical free of unsaturation, R' is a hydrocarbon radical having alkenyl unsaturation, x and y are sufficiently large such that the viscosity ranges from approximately 50 to 100,000 centipoise at 25° C. and such that there are from 0 to 20% by weight R' groups; (ii) approximately 0.1 to 10 parts by weight of a trimethyl chain-stopped polymethylhydrogen siloxane fluid cross-linking agent having from approximately 10% to 100% by weight SiH groups and having a viscosity in the range of from 25 to 1,000 centipoise at 25° C.; and (iii) an effective amount of platinum catalyst for facilitating a heat cure hydrosilation reaction; (b) approximately 2.0 to 10 parts by weight of an MQ resin having an M to Q ratio of from 0.5 to 1.0:1, wherein M represents $R_3SiO_{0.5}$ units and Q represents $SiO_2$ units and wherein R is a monovalent hydrocarbon radical; and (c) 0 to 10 parts by weight of an adhesion promoter;

against a vertically cohesive ink disposed on a cellulosic substrate; and (b) applying pressure to the side of said polyethylene terephthalate film having said release coating thereon to effect transfer of the vertically cohesive ink from said cellulosic substrate to said type-correcting tape and wherein the adhesive has a greater affinity for the vertically cohesive ink than for the substrate and has a greater internal cohesion than external adhesion.

11. A method for making an ink-removing article comprising the steps:

(a) applying to a backing material a silicone pressure sensitive adhesive composition which is the co-condensation reaction product of a mixture containing 100 parts by weight of a trimethyl chain-stopped MQ silicone resin having an M to Q ratio ranging from 0.5 to 1.0:1 and 44 to 57 parts by weight of a dimethylpolysiloxane gum having a penetration ranging from 500 to 1,200 millimeters at 25° C., and (b) curing said silicone pressure sensitive adhesive composition to said backing material in the presence of a catalyst and wherein the adhesive has a greater affinity for the vertically cohesive ink than for the substrate and has a greater internal cohesion than external adhesion.

12. The method of claim 11 wherein said backing material is flexible.

13. The method of claim 11 wherein said backing material is selected from the group consisting of polyethylene terephthalate, paper, cloth, polyethylene and polytetrafluoroethylene.

14. The method of claim 11 wherein said backing material is a film of polyethylene terephthalate approximately 1 mil in thickness.

15. The method of claim 11 wherein said pressure sensitive adhesive composition is cured to said backing material in a layer of from 0.3 mil to 0.8 mil in thickness.

16. The method of claim 11 wherein said pressure sensitive adhesive composition is cured to said backing material in a layer of from 0.4 mil to 0.6 mil in thickness.

17. The method of claim 11 wherein said pressure sensitive adhesive composition is cured to said backing material in a layer approximately 0.5 mil in thickness.

18. The method of claim 11 wherein said curing of the pressure sensitive adhesive composition is effected in the presence of 0.01 to 3.0 percent by weight of an organic peroxide catalyst based on the silicone content of said pressure sensitive adhesive composition.

19. The method of claim 18 wherein said catalyst is benzoyl peroxide or dichlorobenzoyl peroxide.

20. The method of claim 19 wherein said benzoyl peroxide or dichlorobenzoyl peroxide catalyst is present in an amount ranging from 1.0 to 2.0 percent by weight based on the silicone content of said pressure sensitive adhesive composition.

21. The method of claim 19 wherein said benzoyl peroxide catalyst is present in an amount of approximately 1.0 percent by weight based on the silicone content of said pressure sensitive adhesive.

22. The method of claim 11 wherein said pressure adhesive composition is cured to said backing material at a temperature ranging from 80° C. to 175° C.

23. The method of claim 11 wherein said pressure sensitive adhesive composition is cured to said backing material by heating at a temperature of 90° C. for two minutes and at 165° C. for two minutes.

24. The method of claim 11, wherein said backing material is rolled into a tape, further comprising a release coating on the side of said backing material opposite said pressure sensitive adhesive composition, said release coating comprising:

(a) 100 parts by weight of a silicone composition comprising:

(i) 100 parts by weight of a vinyl chain-stopped diorganopolysiloxane base polymer having the formula

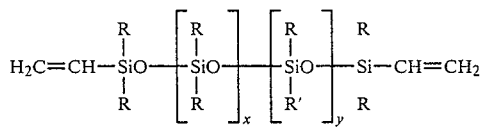

wherein R is a monovalent hydrocarbon radical free of unsaturation, R' is a hydrocarbon radical having alkenyl unsaturation, x and y are sufficiently large such that the viscosity ranges from approximately 50 to 100,000 centipoise at 25° C. and such that there is from 0 to 20% by weight R' groups;

(ii) approximately 0.1 to 10 parts by weight of a trimethyl chain-stopped polymethylhydrogen siloxane fluid cross-linking agent having from approximately 10% to 100% by weight SiH groups and having a viscosity in the range of 25 to 1,000 centipoise at 25° C.; and (iii) an effective amount of platinum catalyst for facilitating a heat cure hydrosilation reaction;

(b) approximately 2.0 to 10 parts by weight of an MQ resin having an M to Q ratio of from 0.5 to 1.0:1, wherein M represents $R_3SiO_{0.5}$ units and Q represents $SiO_2$ units and wherein R is a monovalent hydrocarbon radical; and (c) 0–10 parts by weight of an adhesion promoter.

25. A method for making a type-correcting tape comprising the steps:

(a) applying to a polyethylene terephthalate film of approximately 1 mil in thickness a coating of a pressure sensitive adhesive composition approximately 0.5 mil in thickness, which pressure sensitive adhesive composition is the co-condensation reaction product of a mixture containing 100 parts by weight of a trimethyl chain-stopped MQ silicone resin having an M to Q ratio ranging from 0.5 to 1.0:1 and 44 to 57 parts by weight of a dimethylpolysiloxane gum having a penetration ranging from 500 to 1,200 millimeters at 25° C.;

(b) curing said pressure sensitive adhesive composition to said polyethylene terephthalate film by heating at a temperature of 90° C. for two minutes and at 165° C. for two minutes in the presence of 1% benzoyl catalyst;

(c) applying a release coating to the opposite side of said polyethylene terephthalate film, said release coating comprising:
  (i) 100 parts by weight of a silicone composition comprising:
    (a) 100 parts by weight of a vinyl chain-stopped diorganopolysiloxane base polymer having the formula

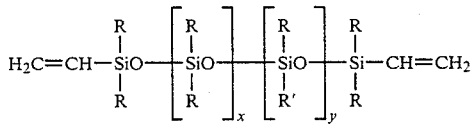

wherein R is a monovalent hydrocarbon radical free of unsaturation, R' is a hydrocarbon radical having alkenyl unsaturation, x and y are sufficiently large such that the viscosity ranges from approximately 50 to 100,000 centipoise at 25° C. and such that there is from 0 to 20% by weight R' groups;
    (b) approximately 0.1 to 10 parts by weight of a trimethyl chain-stopped polymethylhydrogen siloxane fluid cross-linking agent having from approximately 10% to 100% by weight SiH groups and having a viscosity in the range of 25 to 1,000 centipoise at 25° C.; and
    (c) an effective amount of platinum catalyst for facilitating a heat cure hydrosilation reaction;
  (ii) approximately 2.0 to 10 parts by weight of an MQ resin having an M to Q ratio of from 0.5 to 1.0:1, wherein M represents $R_3SiO_{0.5}$ units and Q represents $SiO_2$ units and wherein R is a monovalent hydrocarbon radical; and
  (iii) 0 to 10 parts by weight of an adhesion promoter, (d) curing said release coating to said polyethylene terephthalate film by heating at approximately 350° C. for 30 seconds; and (e) rolling said doubly coated polyethylene terephthalate film into a tape such that said release coating is interspersed between the surface of said pressure sensitive adhesive and the adjacent surface of said polyethylene terephthalate film.

* * * * *